United States Patent [19] [11] 4,193,441
Scaringe [45] Mar. 18, 1980

[54] VARIABLE CAPACITY THERMAL STORAGE SYSTEM EMPLOYING THERMAL SWITCHING

[76] Inventor: Robert P. Scaringe, 1709 Tibbits Ave., Troy, N.Y. 12180

[21] Appl. No.: 865,943

[22] Filed: Dec. 30, 1977

[51] Int. Cl.² .............................................. F28D 21/00
[52] U.S. Cl. ...................................... 165/32; 126/400; 165/104 S
[58] Field of Search .................. 165/104 S, 104 R, 32; 126/400, 271

[56] References Cited

U.S. PATENT DOCUMENTS

| | | | |
|---|---|---|---|
| 2,396,338 | 3/1946 | Newton | 165/104 S X |
| 3,062,510 | 11/1962 | Percival | 165/104 S X |
| 3,563,035 | 2/1971 | Raymond | 165/104 S X |
| 4,034,738 | 7/1977 | Barber, Jr. | 237/1 A X |
| 4,082,143 | 4/1978 | Thomason | 165/104 S |

Primary Examiner—Albert W. Davis
Attorney, Agent, or Firm—Bauer & Amer

[57] ABSTRACT

A thermal storage system comprising a contained fluid and a fusible material in thermal communication therewith for cooperatively controlling the elevated temperature of the contained fluid. The fusible material acts as a controller to sequentially distribute thermal energy for storage thereof depending upon availability of the energy from its source, the stored energy subsequently being utilized to maintain the elevated temperature of the fluid in the absence of the thermal energy source.

16 Claims, 2 Drawing Figures

VARIABLE CAPACITY THERMAL STORAGE SYSTEM EMPLOYING THERMAL SWITCHING

BACKGROUND OF THE INVENTION

This invention relates to devices for utilizing thermal energy to heat a contained fluid and for the storage of excess thermal energy for maintaining the fluid in a heated condition.

As a result of recent substantial increases in the cost of commonly-used energy sources such as oil, gas and utility-supplied electricity, the search for alternative sources of inexpensive energy has led to expanded interest in the utilization of sunlight for providing power. In the usual instance, a solar collector panel is positioned to receive incident solar radiation thereon and a primary fluid is circulated in the solar collector for heating by the sunlight impinging thereupon. The primary fluid heated in the solar collector may be advantageously employed to heat a secondary material for a desired application. Where the secondary material used is water, solar energy may be conveniently and inexpensively utilized to provide heated water.

Thus, U.S. Pat. No. 4,003,367 to Wikholm discloses a solar water heater in which initially cool water is circulated through a tubular heat exchange coil positioned in thermal communication with a primary fluid heated in a solar collector. Thermal energy as heat is transferred from the primary fluid to the water during the latter's passage through the coil so as to raise the temperature of the water. However, the Wikholm device fails to include provision for the storage of thermal energy in excess of that necessary to heat the primary fluid. Although the heated primary fluid storage chamber of Wikholm is insulated, once solar radiation is no longer incident upon the solar collector, as for example when the sun sets, the primary fluid cools fairly rapidly and the heating of the water must be accomplished by other means employing more expensive energy sources.

Furthermore, the temperature to which the water is heated during its passage through the heat exchange coil of the Wikholm device is critically dependent upon a number of widely variable factors, including the initial temperature of the water, the velocity of the water as it passes through the coil, and the temperature of the heated primary fluid. Without the provision of complex external control devices, the eventual user of the heated water may be surprised to find the same to be scaldingly hot or maddeningly tepid.

Alternatively, the heated primary fluid may be circulated through a heat exchange coil or the like positioned in thermal communication with a tank or similarly enclosed volume of water to heat the water in the tank to a desired temperature. Thermal energy is thus stored in the specific heat of the water. A thermostat sensing the water temperature can be employed to actuate a cutoff valve at the desired temperature and thereby disconnect the source of heated primary fluid from the heat exchanger so as to prevent the water from further absorbing thermal energy and getting hotter. Such a hot water heater is manufactured by Mor-Flo Industries of Cleveland, Ohio, under the trademark SOLARSTREAM.

Although this device enables substantial control of the water temperature, there is again no provision for the storage of substantial amounts of excess available thermal energy to maintain the desired temperature of the water once the primary fluids begins to cool. Since thermal energy is stored only in the specific heat of the water, the amount of available thermal storage at a given temperature may be increased only by increasing the volume of water in the tank. Even so, in the absence of available heated primary fluid for heat exchange, the temperature of the water will soon begin to drop below the desired temperature and an external source of energy, such as electricity, must then be employed to insure a continued supply of hot water.

It is well known in the art to store thermal energy in the specific heat of an external mass of material such as a particulate pebble or rock bed. Such storage materials are generally quite massive and voluminous and, therefore, require a great deal of space atop a reinforced support surface. It has also been recognized that thermal energy may be stored in certain fusible substances or materials as the latent heat of fusion thereof, as typified by the constructions of U.S. Pat. No. 3,356,828 to Furness and No. 3,532,856 to Collins. However, the use of any of these materials or the like for the storage of excess thermal energy not immediately required to heat the water or other secondary fluid requires considerable external control apparatus to prevent the storage material from initially absorbing thermal energy required to first heat the water. Without such external controls, on a cloudy day when little solar radiation is available to heat the primary fluid for thermal energy transfer therefrom, the water may be unable to absorb sufficient heat to raise the temperature of the same to the desired maintenance temperature due to the simultaneous absorption of much of the available thermal energy by the additional storage material.

OBJECTS OF THE INVENTION

It is, therefore, the desideratum of the present invention to provide a device for use with a source of thermal energy such that the said energy source is initially employed to heat a contained liquid to a desired temperature and thereafter additional thermal energy not required for heating the liquid is stored in a thermal medium so as to enable the subsequent maintenance of the liquid in a heated condition in the absence of the source of thermal energy.

It is a further object of the present invention to provide such a device that does not require external control mechanisms for the sequential distribution of thermal energy between the liquid and the thermal medium.

It is still another object of the present invention to provide such a device wherein the liquid and the heat storage material cooperate with one another to maintain the liquid at the desired heated temperature.

It is yet a further object of the present invention to provide such a device that is relatively compact and which may be easily and inexpensively manufactured utilizing well-known techniques and standard components.

The above description, as well as further objects, features and advantages of the present invention, will be more fully appreciated by reference to the following detailed description of a presently preferred, but nonetheless illustrative, embodiment in accordance with the present invention when taken in conjunction with the accompanying drawings.

BRIEF DESCRIPTION OF THE DRAWING

In the accompanying drawing, wherein like reference numerals designate like parts throughout the several views.

DETAILED DESCRIPTION OF THE PREFERRED EMBODIMENT

Figures 1, 2:
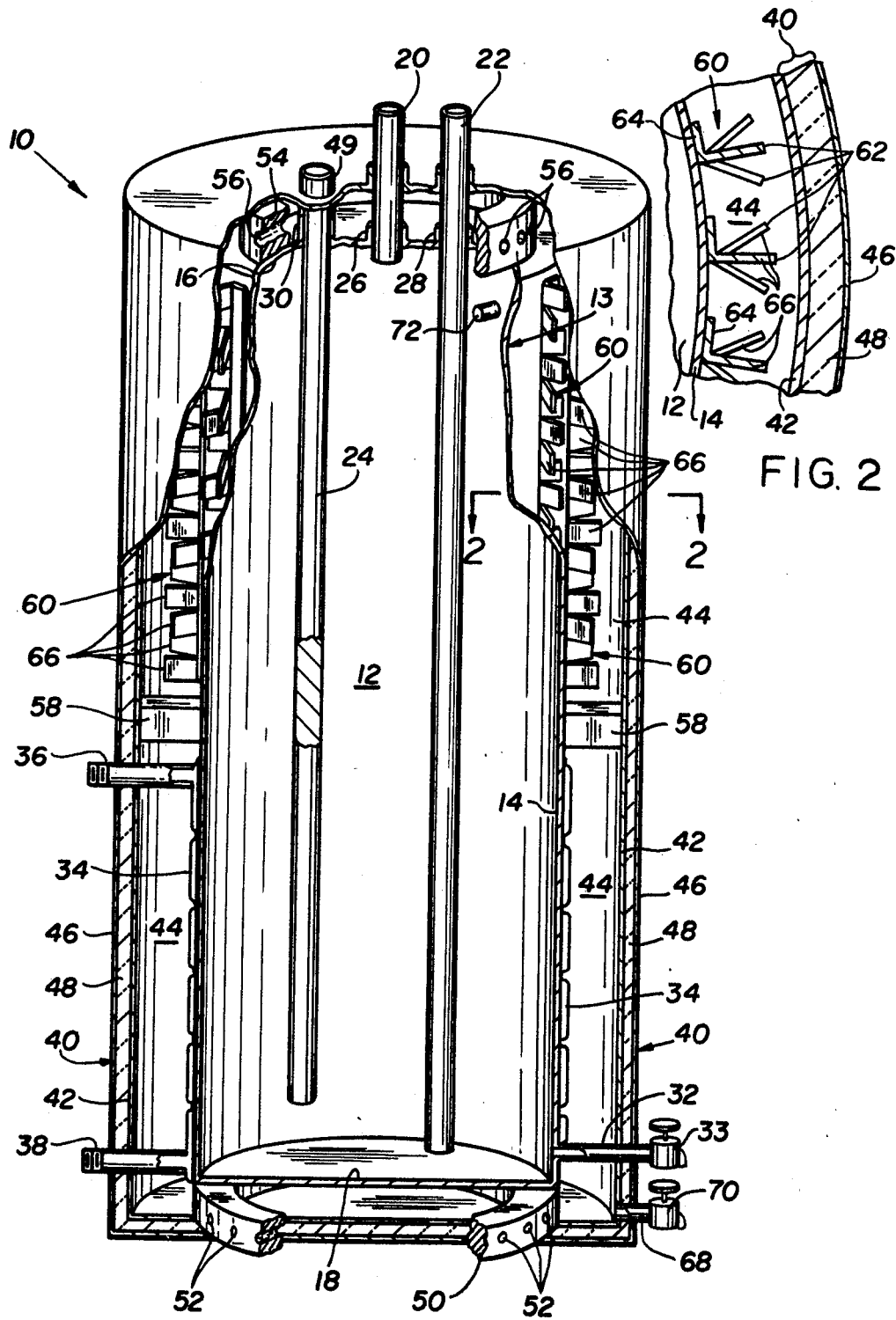
FIG. 1 is a perspective view, partially in section, of a solar-powered fluid heater constructed according to the teachings of the present invention detailing the preferred structural arrangement thereof.
FIG. 2 is an enlarged plan view taken along the lines 2—2 in FIG. 1, detailing the arrangement of the thermally conductive heat transfer fins extending from the inner tank wall.

The present invention teaches the use of a source of thermal energy, a fluid for heating to a desired elevated temperature by the thermal energy source, and a thermal medium for storing thermal energy so as to enable the maintenance of the fluid in a heated condition after the thermal energy source is no longer available. It recognizes that by a careful selection of the thermal medium employed and through a cooperative arrangement of the elements, the fluid and the thermal medium thermally interact with one another to cooperatively maintain the elevated temperature of the liquid. Furthermore, the liquid and thermal medium synergistically function to sequentially distribute therebetween thermal energy from the source thereof so as to efficiently utilize the available thermal energy; the said sequential distribution insures that the fluid reaches the desired elevated temperature before the thermal medium begins to store substantial amounts of additional thermal energy for subsequent maintenance of the liquid in its heated condition. Thus, the invention teaches an arrangement that results in the provision of a sequential controller, exclusive of external controls, for switching the storage of thermal energy between a fluid to be initially heated and a storage medium for storing excess available energy not immediately required for further heating of the fluid.

The present invention of a thermal storage system is herein shown embodied in a solar-powered fluid heater, and the above as well as further and additional features and contributions of the invention will be fully described hereinafter as this description proceeds. However, it should be understood that the fluid heater of this disclosure is meant to be illustrative only and those skilled in the art will readily recognize that the present invention may be embodied in any number of other constructions for similar or other applications.

Likewise, the use of solar radiation or power to provide a source of thermal energy is similarly merely illustrative in nature and another source of heat for use in thermal energy transfer, such as an electric heating element or coil, may be substituted therefor to suit a particular application or use. Nevertheless, for convenience of description and to facilitate a full and complete understanding of the present invention, the same is described with regard to its application in a solar-powered liquid heater. In particular, the disclosed structure advantageously lends itself to use as a water heater to provide a supply of heated water to a home or other premises.

Turning now to the drawings, there is shown in FIG. 1 a preferred embodiment of a fluid heater or thermal storage device, generally designated by the reference numeral 10, constructed according to the present invention. An inner tank or reservoir 12, which may be of substantially circular cross-sectional configuration, is defined by the enclosure bounded by the inner tank wall generally designated 13. The tank wall 13 more particularly comprises an elongated continuous side wall 14, a top wall 16 and a bottom or base wall 18. The walls 14, 16 and 18 are fabricated of a thermally or heat conductive material for reasons that will become clear as this description proceeds. The inwardly disposed surfaces of these walls may be stone or glass lined to prevent corrosion thhereof.

The reservoir or tank 12 is adapted to hold a supply of liquid, as water, therein and is provided with an outlet 20 shown as an elongated pipe or conduit projecting through the top wall 16 and terminating proximate thereto within the tank. An inlet conduit or pipe 22 similarly projects into the tank 12 through the top wall 16 and extends downwardly to a position proximate the bottom wall 18. Thus, after the inner tank 12 has been initially filled with liquid and a desired quantity thereof is withdrawn through the outlet 22 so as to replace that which has been withdrawn and maintain the tank in its filled condition.

An anode rod 24, the use of which is well known in the art, also extends through the top wall 16 and into the tank 12. The anode rod 24 is formed of a sacrificial material, such as zinc where the contained liquid is water, to provide a corrosive substance which may be eroded by galvanic action so as to avoid corrosion of the tank 12 and its associated pipes and fittings. The outlet and inlet pipes 20 and 22 and the anode rod 24 may thread into or frictionally engage upstanding flanges or collars 26, 28 and 30, respectively, of the top wall 16 to prevent the contained liquid from escaping from the tank 12, and an epoxy or the like may also be employed at the flanges 26 and 28 to further insure a fluid-tight seal and to avoid longitudinal movement of the pipes 20 and 22 relative to the inner tank 12. A drain pipe 32 and associated valve 33 thereon project from the lower portion of the tank side wall 14 to enable the draining of the contained liquid from the reservoir 12 as required.

A heat exchanger 34 is circumferentially wrapped around the outer surfaces of the reservoir side wall 14 along at least a portion of the length or elongation thereof so as to position the exchanger 34 in thermal communication with the inner tank 12. The heat exchanger 34 is of well-known design and generally comprises an envelope defining a tortuous interior flow passsge for circulating a heat exchange or transfer fluid therethrough. As shown in FIG. 1, the heat exchanger 34 preferably encircles the tank side wall 14 about its lower portion and includes inlet and outlet conduits 36 and 38 to enable a continuous controlled exchange of transfer fluid through the interior of the heat exchanger 34 in a manner and for purposes that will be described hereinafter. A layer or film of thermal grease may be employed between the side wall 14 and the heat exchanger 34 to increase the thermal conductivity therebetween.

Surrounding the inner tank 12 and radially spaced therefrom is a thermally insulative outer shell generally designated 40 and shown more clearly in FIG. 2. The outer shell 40 comprises a fluid-tight wall 42 which, in conjunction with the inner tank wall 13, defines an outer tank 44 therebetween, an outer casing or cover 46 radially outwardly spaced from the outer tank wall 42 and a layer of thermal insulation 48 therebetween. To increase the thermal insulation provided by the outer shell 40, the inwardly disposed surface of the outer tank wall 42 may be coated with a shiny, metallic reflective surface or the like. The outer casing 46 may be fabricated of a simple sheet metal wrap, whose inwardly disposed surface may be similarly reflective.

As seen in FIG. 1, the inner tank outlet, inlet and drain pipes 20, 22 and 32 and the heat exchanger inlet and outlet conduits 36 and 38 extend through appropriately located and sized openings in the outer shell 40. In order to insure that the outer tank 44 remains fluid-tight, a sealant, such as epoxy or the like, may be advantageously employed. In addition, the anode rod 24 extends through the outer shell 40 and, since the rod 24 will ocassionally require removal and replacement, the outer shell 40 may include a threaded aperture (not shown) for engagement with conforming threads on the end portion 49 of the anode rod 24. The flange or collar 30 may upwardly extend from the inner tank top wall 16 to the outer tank wall 42 and be sealed or secured to the latter to provide a closed passage for the anode rod 24 therebetween so as to maintain the outer tank 24 fluid-tight during replacement of the anode rod 24.

The inner tank 12 is supported on and spaced from the outer shell 40 by a support member 50. The member 50 is seen in FIG. 1 to comprise an annular ring positioned between the base wall 18 and the outer tank wall 42. A plurality of bores 52 extend through the member 50 for reasons that will become clear as this description proceeds. However, it should be apparent that the particular configuration of the support member 50 is purely a matter of design choice and the same could just as easily be formed of a plurality of smaller members for distributing the weight of the inner tank 12 therebetween.

Likewise, an annular spacing member 54 includes a plurality of through-bores or breather holes 56 therein and is positioned between the inner tank top wall 16 and outer tank wall 42 to maintain the outer-tank defining spacing therebetween. To prevent lateral shifting of the inner tank 12 relative to the outer tank wall 42, a plurality of spacing members or blocks 58 may similarly be radially circumposed about the inner tank side wall 14. It may, therefore, be appreciated that the outer tank 44 fully and completely surrounds the inner tank 12 and its volume is a function of the size of the support members 50, 54 and 58 relatively spacing the inner and outer tank walls 13 and 42 from one another.

A plurality of thermally-conductive heat transfer fins generally designated 60 extend outwardly from at least a portion of the length of the inner tank side wall 14 into the outer tank 44. The fins 60 preferably are positioned on the upper portion of the side wall 14 and are seen in enlarged detail in FIG. 2 to extend only partially into the outer tank 44 so as to space their free ends 62 inwardly of the outer tank wall 42. The fins 60 may be fabricated of sheet metal or any similarly thermally conductive material and may be formed in the manner shown in the drawing.

Specifically, and by way of example only, the fins 60 are seen to comprise a plurality of elongated, rectangular metallic sheets each bent along the elongation thereof to form a pair of substantially perpendicular legs. The metallic sheets are vertically affixed to and in circumferentially spaced relation about the side wall 14 along one of the perpendicular legs 64. The other of the legs of each is transversely cut or slotted along the length thereof so as to form a series of depending tabs 66 extending from the side wall 14 into the outer tank 44. The plural depending tabs 66 may then be alternately laterally bent as shown to vary the angle at which the various tabs 66 project outwardly from the side wall 14 so as to facilitate an even distribution of thermal energy transfer between the inner and outer tanks 12 and 44.

The outer tank 44 is substantially filled with a thermal switching medium comprising a fusible material. The said fusible material is normally in a low thermal conductivity solid state or phase and in such solid state acts substantially as an insulator. At the melting point or temperature of the fusible material the same liquifies and becomes highly thermally conductive, remaining substantially at said melting temperature until liquification is complete throughout. A preferred thermal medium for use with the present invention is wax, and more particularly a fully refined paraffin or normal hydrocarbon of the water white (fluid) grade, although other materials having like properties may be employed instead. However, the use of wax in the following description is not meant to limit the practice of the present invention to employment thereof and should be understood to be solely for convenience and ease of explanation and illustration.

The wax or other fusible material does not entirely fill the outer tank 44. A small pocket or space must be provided in the outer tank 44 to allow for expansion and contraction of the thermal medium as the same alternately solidifies and liquifies during operation of the thermal storage device 10. This expansion space or pocket may advantageously be filled with a non-reactive or non-oxygen containing gas to avoid oxidation of the wax. Gases such as nitrogen, helium, neon and the like are satisfactory for this purpose and the selection of the gas is not critical to proper operation and use of the device 10. As a result of the highly compressible nature of gases, the thermal medium is therefore able to expand without deforming or damaging the outer tank wall 42. So long as the outer tank 44 is fluid-tight, and the selected gas non-reactive as described, there is no need for a separately defined and bounded envelope to contain the gas and the gas may accordingly be advantageously included with the thermal medium in the outer tank 44.

The outer tank 44 may be further provided with a drain pipe 68 proximate the bottom thereof to enable the tank 44 to be emptied of the thermal medium while the same is in its liquid phase or state. The pipe 68 is shown to extend through the outer shell 40 and to include a valve 70 to retain the fluid-tightness of the outer tank 44 and prevent the inadvertent loss of the thermal medium in its liquid state.

In utilizing the thermal storage device 10, the inlet conduit 22 is attached to a supply of cold water and the outlet conduit 20 to the hot water pipes of the building. The outlet conduit 20 may alternatively be attached to the inlet of a supplementary conventional water heating means which would be activated only in the event that the inventive storage device 10 could not supply or maintain a sufficient quantity of heated water at the desired temperature. The outlet conduit 20 may also have associated therewith a pressure relief valve (not shown).

Typically, heated water supplied by the device 10 to the outlet conduit 20 is too hot for direct use and is, therefore, mixed with selected quantities of cooler water at the point of use to obtain heated water of a desired temperature. As hot water is withdrawn from the inner tank 12, cooler replacement water enters the same through the inlet conduit 22 so as to maintain a filled condition of the inner tank 12 at all times.

The heat exchanger 34 is attached to a source of thermal energy or heated fluid material, as for example a solar collector panel or the like and associated control apparatus therefor which is well known in the art. As understood, a heat transfer or exchange fluid is heated by incident solar radiation as it is pumped through one or more solar collector panels. The heated fluid subsequently enters the heat exchanger 34 at the inlet 36, circulates through the tortuous path of the exchanger 34 circumposed about the inner tank 12 and leaves the exchanger through the outlet 38. The transfer fluid may thereafter be recirculated to the solar panels for further heating. Any standard heat transfer fluid may be circulated through the heat exchanger 34 without danger of contaminating the water in the inner tank since a double wall—the inner tank side wall 14 and the wall of the heat exchanger 34—is interposed between the water and the heat transfer fluid. Consequently, toxic transfer fluids such as ethylene glycol may be safely employed in conjunction with the solar collectors.

As the heated transfer fluid circulates through the heat exchanger 34, it gives up thermal energy as heat to the contained water in the inner tank 12 positioned in thermal communication with the exchanger 34. The absorption of thermal energy by the water causes its temperature to rise as it stores the energy in the elevated temperature thereof. Accordingly, the temperature of the water in the lower portion of the inner tank 12 about which the heat exchanger 34 is wrapped begins to rise as the water absorbs thermal energy from the heated transfer fluid. The resulting uneven temperature distribution of the contained water induces convection currents within the inner tank 12 which work to maintain a substantially constant temperature throughout the same. The tank-encircling solid-phase wax, which is characterized by low thermal conductivity in its normally solid state, provides substantial insulation to heat loss from the inner tank 12 and, in conjunction with the insulated outer shell 40, effectively prevents significant loss of thermal energy from the contained water.

As seen in FIG. 1, the outwardly-oriented surface of the heat exchanger 34 is positioned in direct thermal communication with the wax. As a consequence, when the heated transfer fluid circulating through the heat exchanger 34 approaches the melting point of the wax, the wax will begin to melt along the conterminous boundary therebetween. This facet of the present invention will be further discussed as this description proceeds.

The heating of the water in the inner tank 12 continues as the heated exchange fluid is circulated through the heat exchanger 34. As the temperature of the contained water approaches the melting or triggering temperature of the wax, the wax along the inner tank wall 13 begins to liquify. The heat transfer fins 60, which project from the upper portion of the side wall 14 partially into the wax-filled outer tank 44, effectively increase the available surface area along which heat transfer between the contained water and the wax may occur. This increased heat transfer surface area enables the low thermal conductivity solid wax to more quickly and efficiently absorb thermal energy from the water so as to cause the melting or liquidification of the same. In melting, the wax stores the absorbed thermal energy as its latent heat of fusion.

As a result of the low thermal conductivity of the solid phase wax and its relative placement in the thermal storage device 10, melting of the same first occurs along the inner tank 13 and transfer fins 60. Since the fins project and, therefore, conduct or transfer heat only partway into the outer tank 44, the radially-outwardly disposed portion or layer of the wax remains, at least initially, in a solid state and continues to serve as additional insulation against loss of heat from the inner tank 12. Aided by convection currents that arise within the outer tank 44, the wax continues to melt or liquify at increasing distance from the fins 60. The wax layer adjacent the outer tank wall 42 is the last portion thereof to melt.

Throughout the melting or liquification of the wax, its temperature remains substantially at its melting or triggering temperature, although during such melting the wax continues to absorb thermal energy from the contained water. This constant temperature liquification is possible because the absorbed energy is stored as the latent heat of fusion of the wax and not in a further temperature elevation thereof. Put another way, there is latent rather than specific heat storage. When the wax subsequently resolidifies, as will be discussed hereinafter, the latent-heat-stored thermal energy is released or given off by the wax at substantially the same triggering temperature.

During the constant temperature liquification of the wax, the contained water is maintained substantially at the melting temperature of the wax as a result of the thermal communication and heat transfer positional arrangement therebetween. That is, since the wax is melting and absorbing thermal energy at a constant temperature, it draws heat above the melting temperature from the water so as to keep the two liquids at substantially the same temperature. Thus, although the water continues to absorb thermal energy from the transfer fluid, the wax effectively controls and stabilizes the temperature of the water by absorbing therefrom excess thermal energy which would otherwise cause a further elevation in the water temperature. The said stabilized or storage temperature of the water substantially corresponds to the melting or triggering temperature of the wax.

Likewise, if the temperature of the contained water drops below the melting or triggering temperature, as for example at nightfall when heated exchange fluid is no longer available for circulation through the heat exchanger 34, the liquid wax, in seeking to maintain the two liquids at equal temperatures, transfers a portion of the energy stored therein as latent heat of fusion to the water in the form of heat. In this manner, the temperature of the contained water is raised so as to restore the same to the triggering or storage temperature. At the same time, a portion of the wax resolidifies as a consequence of the loss of that energy which it released to the water to maintain the elevated temperature thereof.

It should, therefore, be clear that the elevated storage temperature at which the contained water is desirably maintained is determined by and substantially conforms to the melting temperature of the wax. Consequently, the water storage temperature may be advantageously predetermined by selecting a fusible material which melts or liquifies substantially at the predetermined temperature. By way of example, various paraffin waxes have melting points in the range of 115° to 200° F. Thus, by the judicious selection of a particular wax, the water storage temperature of the device 10 may be easily predetermined within a reasonably convenient range.

In essence, the thermal storage device 10 provides a variable capacity thermal storage system employing thermal switching for sequential distribution and control of energy storage. This is best understood with reference to operation of the storage device 10 under varying conditions of thermal input availability.

On cloudy or similarly overcast days, when little incident solar radiation is available to heat the transfer fluid, there is little available thermal energy input as heat into the system. It is desirable under such conditions that all available thermal energy be utilized to heat the water in the inner tank without simultaneously diverting any of the thermal energy to the wax. That is, at least until the water in the inner tank 12 reaches the predetermined storage temperature, thermal energy input to the device 10 should be stored in the specific heat capacity of the water and not in the latent heat of the wax.

With little available heat input, the heat transfer fluid releases thermal energy to the contained water in the manner as earlier described. Even if the elevated temperature of the transfer fluid reaches the wax melting point, there will be little significant liquification of the wax along its conterminous boundary with the heat exchanger 34 and, therefore, substantially all of the available thermal energy will be utilized to heat the contained water. The wax remains substantially in its solid phase or state unless and until the water temperature approaches the triggering temperature and serves to insulate the inner tank 12 against dissipative heat loss. Little thermal energy is available and consequently only a limited storage capacity is required.

Accordingly, the thermal storage capacity of the device 10 under conditions of low or limited thermal energy availability lies substantially in the specific heat storage capacity of the contained water. This capacity is a direct function of the volume of the inner tank 12 and the temperature of the heated water therein; a given volume of water to be maintained at a predetermined elevated temperature can specifically store only a fixed amount of thermal energy at that temperature. When the source of thermal energy input is no longer available and the temperature of the water in the inner tank 12 subsequently begins to drop, a conventional energy source such as electricity or fossil fuels must be employed to heat the water and return it to the desired storage temperature since there has been little or no additional thermal energy storage.

On sunny days when there is sufficient solar input and, hence, thermal energy available to the device 10, a large thermal storage capacity is desirable so that energy may be stored for reduced-sunlight and evening demands. Thus, as the heated transfer fluid circulates through the heat exchanger 34, it gives up or releases thermal energy principally to the contained water which stores the energy in its specific heat capacity as an elevated temperature. A small portion of the available energy is simultaneously absorbed by the wax at the heat exchanger-wax interface. It should be noted that this direct heat transfer from the transfer fluid to the wax only becomes effective as the temperature of the exchange fluid approaches the melting point of the wax. In turn, this will occur only when sufficient quantities of thermal energy are available to the device 10 to enable secondary energy storage in addition to the primary heating of the contained water.

As the temperature of the water in the inner tank 12 approaches the predetermined storage temperature, the wax begins to melt or liquify as it absorbs heat from the water and stores this thermal energy as its latent heat of fusion. Additional thermal energy absorbed by the water from the heat exchanger 34, which would otherwise further raise the water temperature beyond the wax melting temperature, is instead absorbed and stored by the wax. Since it melts at approximately constant temperature and is positioned in thermal communication with the inner tank 12, the wax thermally cooperates with the contained water to maintain the water temperature substantially at the melting point of the wax. Thus, the thermal medium or fusible material effectively increases the storage capacity of the device 10 without increasing the volume of the inner tank 12 or the storage temperature of the water when large quantities of thermal energy are available to the system.

It should be appreciated that the wax acts as a switch to enable it to store thermal energy only after the contained water reaches the predetermined storage temperature. The wax switches or triggers, at the predetermined storage temperature, from a low thermal conductivity solid to a relatively high conductivity liquid while absorbing and storing thermal energy. In so doing, it provides for variable storage capacity by absorbing from the heat transfer fluid additional thermal energy not required to further heat the contained water. Thus, the effective storage capacity of the contained water increases as the amount of thermal energy available to the system increases.

The wax continues to absorb available thermal energy until it is fully liquified throughout. At this point the latent heat capacity of the wax has been fully utilized and both the water and the wax exist at the predetermined water storage temperature. If still additional thermal energy input is available to the system, a third area of storage is utilized as the specific heat of the molten wax. The temperature of the liquid wax and of the contained water thereafter jointly rise above the predetermined storage temperature as both liquids specifically store the additional thermal energy through elevation of their fluid temperatures. A thermostatic switch means or sensor 72 may be positioned in the inner tank 12 to sense the water temperature for disconnecting the thermal energy source from the heat exchanger 34 when the water temperature reaches a selected upper limit. This upper limit should be chosen to be less than 212° F., the boiling point of the water.

When the source of thermal energy is not longer available, the wax and water jointly begin to cool, each releasing its proportionate share and energy in specific heat storage so as to maintain the temperature of each substantially equal to that of the other. This specific heat loss continues until the two liquids approach the predetermined storage temperature. Subsequently, as the temperature of the contained water drops below the temperature of the molten wax, the wax releases and transfers some of its latent-heat-stored energy to the water so as to elevate the temperature thereof. Thus, the wax thermally cooperates with the contained water to maintain the temperature of the wax and water substantially equal to one another until the wax returns to its normally solid state or phase. The additional insulation provided by the resolidified wax further facilitates the retention of remaining thermal energy stored in the heated contained water. In this manner, the fixed volume of contained water can be maintained in the heated condition for a prolonged period of time without having to resort to a backup water heating system utilizing electricity or the like.

It can, therefore, be appreciated from the foregoing that the disclosed embodiment of the present invention provides an inner tank for containing a fluid and a thermally communicating outer tank holding a fusible material for cooperatively controlling the temperature of the contained fluid in the inner tank. The fusible material acts as a controller to sequentially distribute thermal energy for storage thereof depending upon availability of such energy from its source. The fluid storage temperature may be predetermined by selecting the melting or triggering temperature of the fusible material.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. In a device for heating a liquid and for storing thermal energy to maintain a heated condition of the liquid, said device being adapted for use with a source of heat,
    a reservoir for holding a quantity of the liquid to be maintained in a heated condition and having a thermally-conductive outer wall,
    heat exchanger means connected with the source of heat and positioned exterior to and in thermal communication with at least a portion of said reservoir to enable the transfer of thermal energy from the source of heat to the liquid in said reservoir so as to cause the elevation of the temperature of the liquid,
    and a thermal medium positioned against at least a portion of said reservoir outer wall in direct thermal communication with both said reservoir and said heat exchanger means, said thermal medium being initially in a low thermal conductivity solid state in which said medium acts as a thermal insulator and having a triggering temperature at which said medium reversibly melts to a substantially increased thermal conductivity liquid state while absorbing thermal energy and storing the same as the latent heat of fusion of said medium,
    such that the continued transfer of additional thermal energy through said heat exchanger means to the liquid after the temperature of the liquid in the reservoir has been elevated to said triggering temperature results in the absorption and storage in said thermal medium of said additional thermal energy as the latent heat of fusion thereof so as to substantially maintain the liquid at said triggering temperature, whereby when the temperature of the liquid drops below the triggering temperature of said medium the said additional energy stored in said medium at the latent heat of fusion thereof is then released and transmitted to the liquid so as to maintain the liquid at substantially the triggering temperature of the medium.

2. In a device according to claim 1,
    fin means on at least a portion of said reservoir outer wall and outwardly projecting therefrom into said thermal medium to provide an increased surface area for heat transfer between said medium and the liquid in said reservoir.

3. In a device according to claim 2,
    said fin means projecting only part way into said thermal medium.

4. In a device according to claim 1,
    said triggering temperature of said thermal medium at which said medium converts from a thermal insulating means to an absorption and storage means being selective so as to predetermine the temperature at which the liquid in said reservoir is to be maintained in its heated condition.

5. In a device according to claim 4,
    said thermal medium being paraffin wax.

6. In a device according to claim 1,
    said reservoir including outlet means for enabling the heated liquid to be drawn from the reservoir and inlet means through which additional liquid may be added to said reservoir to replace heated liquid withdrawn therefrom.

7. In a device according to claim 1,
    thermally-insulating outer wall means surrounding said reservoir and thermal medium to substantially insulate said device from the ambient temperature thereabout,
    said outer wall means defining an expansion chamber between said thermal medium and outer wall means to allow for expansion and contraction of said thermal medium as the same changes between said solid and liquid states,
    said expansion chamber being filled with a gaseous fluid substantially non-reactive with said thermal medium.

8. In a controller for the sequential storage of thermal energy,
    a contained liquid,
    a source of heat exterior of the contained liquid for varying the temperature of the contained liquid,
    a normally solid medium having as low a thermal conductivity as that of paraffin wax about the contained liquid to insulate the same and convertible to a liquid state when storing heat and returnable to its normally solid state when it releases its stored heat,
    and said normally solid medium being in direct thermal communication with said contained liquid and with said source of heat and insulating said contained liquid until the liquid achieves a triggering temperature of said medium, said medium thereafter absorbing heat directly from said liquid in excess of the triggering temperature and storing such absorbed heat until such time as said medium changes from its normally solid to a liquid state, whereby thereafter when the temperature of said contained liquid drops below said triggering temperature, said medium releases its heat directly to said contained liquid to maintain said contained liquid at said triggering temperature, said medium in yielding its heat returning to its normal solid insulating state to continue to insulate said liquid.

9. In a heat storage accumulator device according to claim 8,
    said normally solid medium being paraffin wax.

10. In a thermal energy storage device,
    a contained liquid,
    a normally solid switching medium exterior of said contained liquid for direct thermal communication therewith and having a triggering temperature at which said medium changes from its normally solid to a liquid state,
    and a source of thermal energy directly communicating with said contained liquid and said switching medium for varying the temperature of the contained liquid, said liquid and switching medium being interdependent upon one another for the storage of heat such that when the temperature of said contained liquid rises above said triggering temperature, said switching medium is triggered to cause the same to absorb and store the thermal energy thereafter transferred to said liquid from said thermal energy source so as to maintain the temperature of said liquid substantially at said triggering temperature and to prevent the liquid temperature from rising substantially thereabove until the switching medium is entirely melted and assumes said liquid state, after which additional thermal energy from said thermal energy source is absorbed by both said liquid and said switching medium to store said additional thermal energy in each as equally elevated temperatures thereof, whereby when the temperature of said contained liquid drops below the temperature of said switching medium, said medium releases and transfers some of its stored energy to said liquid so as to elevate the temperature of the liquid and thereby maintain the temperatures of said switching medium and liquid substantially equal to one another until said medium returns to its normally solid state.

11. In a thermal energy storage device according to claim 10, said switching medium having a selected triggering temperature, the selected triggering temperature serving to determine the minimum temperature at which said contained liquid is to be maintained.

12. In a thermal energy storage device according to claim 11, thermostatic means associated with said storage device for sensing the temperature of said contained liquid and for preventing further transference of thermal energy to said contained liquid from said thermal energy source when the temperature of said liquid rises above a selected cutoff temperature higher than said triggering temperature, said cutoff temperature representing the maximum temperature at which said contained liquid is to be maintained.

13. In a thermal energy storage device according to claim 12, said source of thermal energy being a heat exchanger circumposed about at least a portion of said contained liquid and including a fluid circuit defined in said heat exchanger for the passage of a heated fluid therethrough so as to transfer thermal energy from the heated fluid to said contained liquid.

14. A device for heating a contained liquid to a selected temperature and for storing thermal energy for use in maintaining the liquid at the selected temperature over a prolonged period of time, said device being adapted for use with a source of thermal energy and comprising:

an inner tank having a thermally-conductive wall bounding an interior closure for containing a quantity of the liquid to be heated;

heat exchange means connected with the source of thermal energy and positioned about at least a portion of said inner tank wall for thermal communication therewith so as to enable a transfer of thermal energy from the thermal energy source to the contained liquid to raise the temperature of the liquid;

a selected thermal switching medium positioned about said heat exchange means and at least a portion of said inner tank wall, said switching medium being in a normally solid, low thermal conductivity insulating state and having a predetermined triggering temperature at which said switching medium reversibly melts to change the same to a substantially increased thermal conductivity liquid state, the selection of said switching medium enabling the predetermination of said triggering temperature which substantially corresponds to the selected temperature at which the contained liquid is to be maintained;

and a thermally-insulating outer shell surrounding and enclosing said switching medium and inner tank to substantially prevent uncontrolled thermal losses from said device during the operation thereof, said outer shell and said switching medium defining a chamber therebetween for accommodating expansion of said switching medium as the same changes between its liquid and normally solid states, such that when the temperature of the contained liquid rises to at least said triggering temperature, said medium switches from a thermal insulating means to a thermal absorption and storage means in which said switching medium cooperatively functions with the contained liquid to maintain the liquid and said medium at substantially the same temperature, whereby said switching medium functions to absorb and store thermal energy from the contained liquid when the temperature of the liquid rises above the temperature of said medium and said switching medium functions to release some of its stored energy to the contained liquid when the temperature of the liquid drops below that of said medium.

15. A device according to claim 14, further comprising fin means on at least a portion of said inner tank wall and outwardly projecting therefrom at least partially into said switching medium positioned thereabout to facilitate the transfer of thermal energy between said medium and said contained liquid within said inner tank.

16. A device according to claim 15, wherein said inner tank wall includes an elongated sidewall substantially vertically disposed in the direction of the elongation thereof, said heat exchange means being positioned circumferentially about a lower portion and said fin means projecting from an upper portion of said sidewall, and said switching medium being encirclingly positioned about said sidewall substantially along the elongation thereof in thermal communication therewith and with said fin means and heat exchange means.

* * * * *